United States Patent Office.

PHILIP H. HOLMES, OF GARDINER, MAINE, ASSIGNOR TO THE HOLMES FIBRE-GRAPHITE MANUFACTURING COMPANY, OF CHICAGO, ILLINOIS.

PROCESS OF MANUFACTURING COMPOSITION JOURNAL-BEARINGS.

SPECIFICATION forming part of Letters Patent No. 482,310, dated September 6, 1892.

Application filed January 2, 1892. Serial No. 416,856. (No specimens.)

*To all whom it may concern:*

Be it known that I, PHILIP HENRY HOLMES, a citizen of the United States, and a resident of Gardiner, Kennebec county, Maine, have invented certain Improvements in the Process of Manufacturing Composition Journal-Bearings, &c., of which the following is a specification.

The object of my invention is to form a composition of matter in which plumbago and fiber are elements and in which an oil-binder is used to make the completed article homogeneous. The composition of matter can be used for such purposes as bearings, packings, projectile guides or rings, and in any place where two parts come into frictional contact, and can also be used as a conductor of electricity.

In carrying out my invention I take plumbago, preferably in a finely-divided state and floated, so as to obtain as pure an article as possible; but it will be understood that other grades of plumbago may be used, if found effective. I then mix with this plumbago divided fiber—that is, fiber which has been reduced to a pulp by any of the ordinary processes—the plumbago and fiber being mixed in a suitable pulp-engine, by preference, so as to thoroughly incorporate the fibers with the mass of plumbago, the proportion of plumbago to fiber depending upon the use to which the composition is to be put; but in the majority of cases the plumbago will be largely in excess.

The liquid which I prefer to use in mixing the plumbago and fiber is simply water in sufficient quantity to make a paste, but I preferably add a small quantity of finely-divided granular mineral substance, which serves with the fiber as a filtering medium when the composition is compressed in the mold. The material which I prefer to use is an inert material—such as gypsum—which material I have used with success, although it will be understood that other granular mineral substances will accomplish the purpose. The compound is then introduced into a mold having perforations to allow for the escape of the liquid and provided with a plunger for compressing the material in the mold. I preferably pump the material into the mold, after which the plunger is forced into the mold until the material is compressed to the degree required and the water or other liquor is driven off from the composition through the perforations in the mold. The compressed composition is then removed from the mold and dried, so as to expel all the moisture therefrom, and is then immersed in a bath of drying-oil or any suitable fluid varnish and allowed to remain until it is impregnated or saturated with the oil, and to facilitate this impregnation it is preferable that the bath of oil should be hot, the mass being more or less saturated with oil, depending upon the character of the composition.

The oil or varnish which I prefer to use is linseed-oil; but I do not wish to restrict myself to any particular kind of oil or varnish, as various kinds of drying-oil or composition of oil, or semi-drying oils, copals, pyroxyline varnishes, and other oil or spirit varnishes may be used. It is sometimes preferable to place the oiled article in a closed vessel heated to a sufficient temperature to assist in driving the oil into the interstices of the composition, the presence of the fine fibers throughout the body of the composition being an important element, as they serve to lead the fluid oil or varnish into the molded article. The molded and oiled compound is placed in a suitable retort or oven and there subjected to a sufficient degree of heat to set, solidify, and harden the mass by developing a resinous film throughout the intimate mixture of fiber and plumbago, the film being due to the action of the heat upon the binding oil or varnish, which thus exercises the desired binding, solidifying, and hardening effect upon the mass and renders it of sufficient strength to become self-sustaining.

I claim as my invention—

1. The process herein described of forming a plumbago composition for bearings, &c., said process consisting in, first, mixing plumbago, fiber, and liquid; second, expelling the liquid by pressure, and, third, impregnating the mass with a liquid binder, substantially as set forth.

2. The process herein described of forming a plumbago composition for bearings, &c., said process consisting in, first, mixing plumbago, fiber, and an inert mineral substance in liquid; second, expelling the liquid by pressure, and, third, impregnating the mass with a liquid binder, substantially as described.

3. The process herein described of forming a plumbago composition for bearings, &c., said process consisting in, first, mixing plumbago, fiber, and liquid; second, expelling the liquid under pressure; third, impregnating the compressed composition with an oil-binder, and, fourth, drying the composition to set the binder, substantially as set forth.

4. The process herein described of forming a plumbago composition for bearings, &c., said process consisting in, first, mixing plumbago, fiber, and gypsum with liquid; second, expelling the liquid by pressure; third, impregnating the compressed composition with an oil-binder, and, fourth, drying the composition to set the binder, substantially as described.

In testimony whereof I have signed my name to this specification in the presence of two subscribing witnesses.

PHILIP H. HOLMES.

Witnesses:
EUGENE ELTERICH,
HENRY HOWSON.